(12) United States Patent
Menkveld et al.

(10) Patent No.: US 9,933,763 B1
(45) Date of Patent: Apr. 3, 2018

(54) CONTROL SYSTEM FOR PROVIDING CLOUD BASED COMMANDS TO CONTROL OPERATION OF INTERNET CONNECTED DEVICES

(71) Applicant: Menklab, LLC, Grand Rapids, MI (US)

(72) Inventors: Justin Menkveld, Grand Rapids, MI (US); Dana O'Dell, Hudsonville, MI (US); Tony Pitman, Pleasant View, UT (US)

(73) Assignee: MenkLab, LLC, Grand Rapids, MI (US)

(*) Notice: Subject to any disclaimer, the term of this patent is extended or adjusted under 35 U.S.C. 154(b) by 195 days.

(21) Appl. No.: 14/715,939

(22) Filed: May 19, 2015

Related U.S. Application Data

(63) Continuation-in-part of application No. 14/555,570, filed on Nov. 26, 2014.

(51) Int. Cl.
   G08C 19/00 (2006.01)
   G05B 15/02 (2006.01)
   H04L 29/08 (2006.01)
   H04L 12/28 (2006.01)

(52) U.S. Cl.
   CPC .......... *G05B 15/02* (2013.01); *H04L 12/2816* (2013.01); *H04L 67/025* (2013.01); *H04L 67/10* (2013.01)

(58) Field of Classification Search
   CPC ............................................ G07C 2009/00928

USPC .................................................. 340/5.7, 5.71
   See application file for complete search history.

(56) References Cited

U.S. PATENT DOCUMENTS

| | | | | |
|---|---|---|---|---|
| 8,866,583 | B2* | 10/2014 | Ordaz | G05B 19/042 340/12.54 |
| 9,317,986 | B2* | 4/2016 | Tehranchi | G07C 9/00309 |
| 2006/0187034 | A1* | 8/2006 | Styers | G05B 9/02 340/545.1 |
| 2010/0283579 | A1* | 11/2010 | Kraus | G07C 9/00944 340/5.7 |
| 2012/0026836 | A1* | 2/2012 | Scripca | G01S 15/18 367/99 |
| 2015/0077219 | A1* | 3/2015 | Keller, Jr. | E05F 15/40 340/5.7 |
| 2015/0235172 | A1* | 8/2015 | Hall | G06Q 10/0833 705/333 |
| 2015/0302734 | A1* | 10/2015 | Geerlings | G08C 19/28 340/5.25 |

* cited by examiner

*Primary Examiner* — Kevin Kim
(74) *Attorney, Agent, or Firm* — Frank M. Scutch, III

(57) ABSTRACT

A control system for providing Cloud based commands to an Internet connected device that includes one or more Cloud servers for receiving commands from at least one mobile web enabled user device. A load balancer is used for receiving communication from a server for distributing commands from at least one web enabled device to the Cloud. A server based Internet connected device activator is used for receiving commands and controlling operation of an Internet connected device from the server. The state of the Internet connected device is determined by information local to the Internet connected device such that is communicated to the server for determining the state of the Internet connected device before activation.

12 Claims, 9 Drawing Sheets

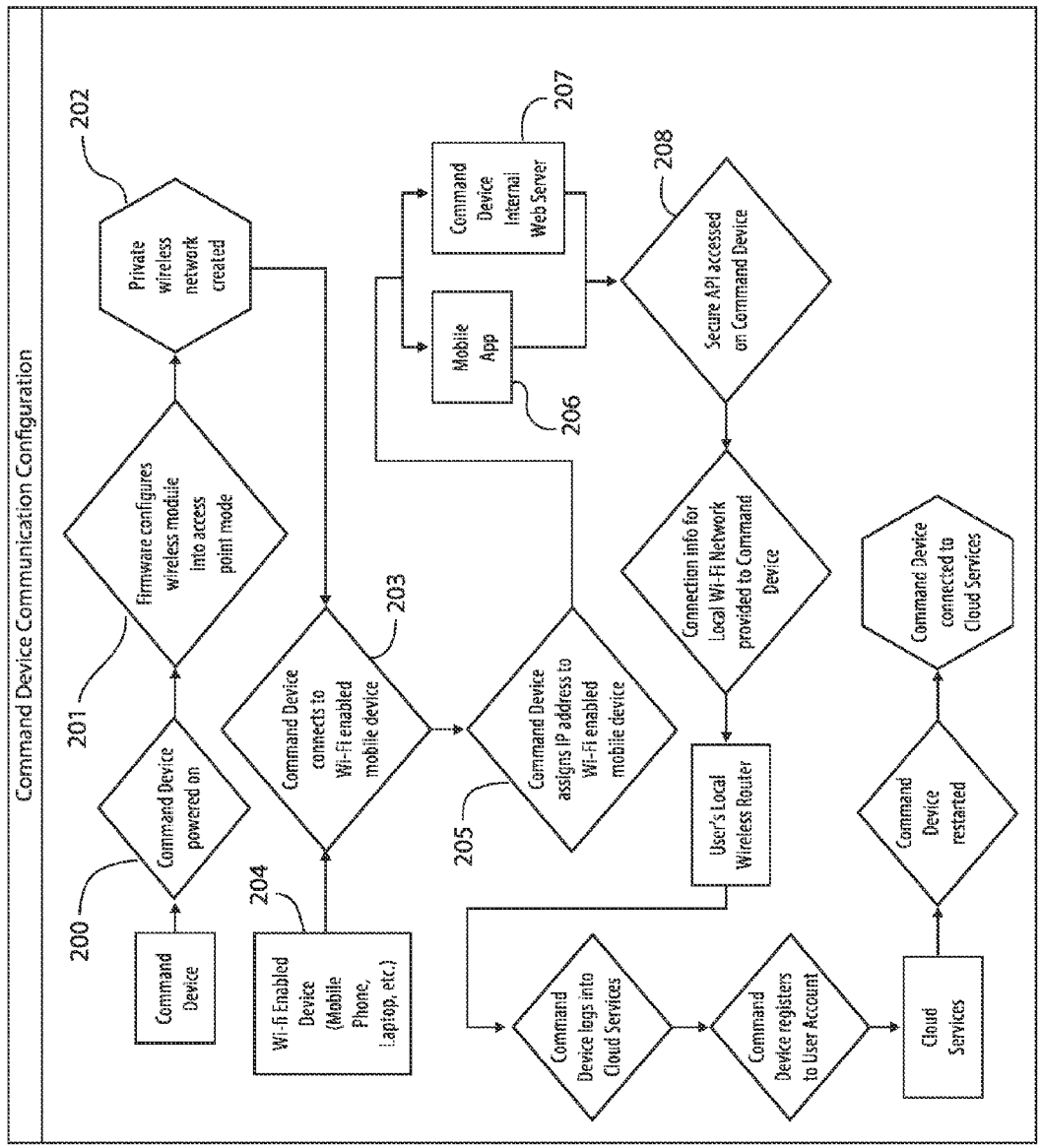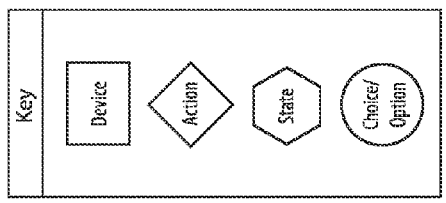
FIG. 2

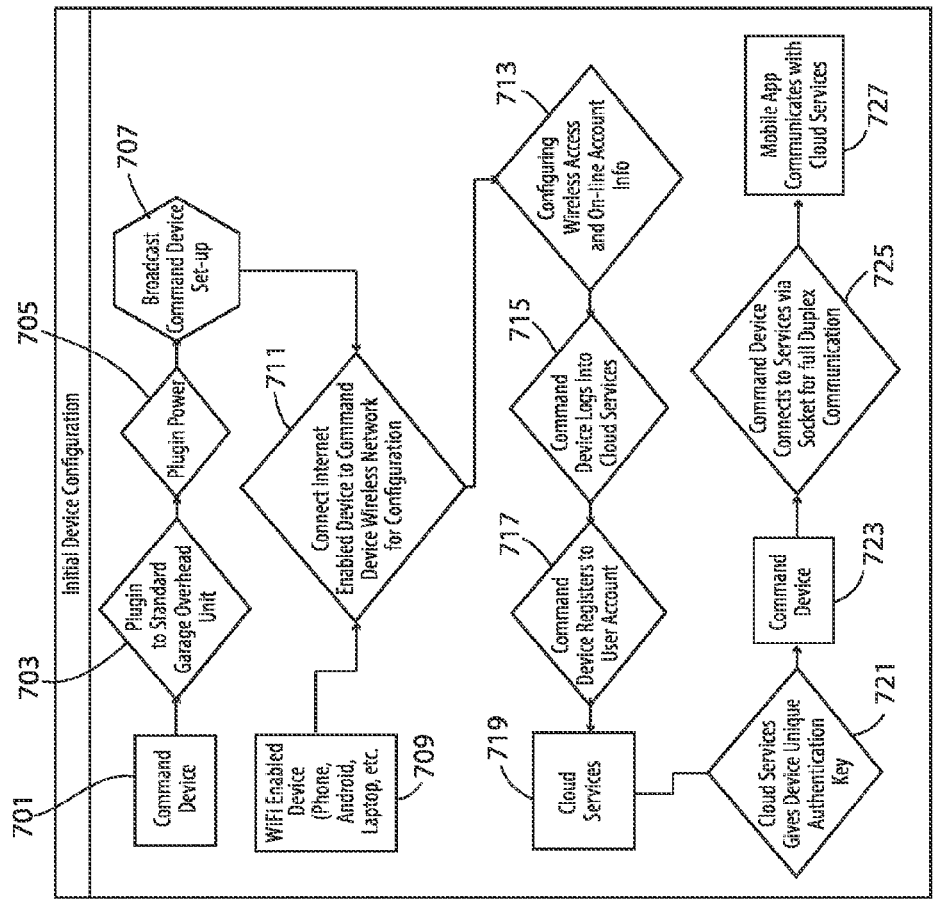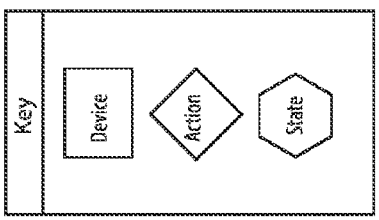
FIG. 7

CONTROL SYSTEM FOR PROVIDING CLOUD BASED COMMANDS TO CONTROL OPERATION OF INTERNET CONNECTED DEVICES

REFERENCE TO RELATED APPLICATIONS

This application is a continuation-in-part of U.S. application Ser. No. 14/555,570 filed Nov. 26, 2014 entitled "Control System for Providing Cloud Based Commands for Controlling Operation of a Moveable Barrier", owned by Menklab, LLC.

FIELD OF THE INVENTION

The present invention relates generally to Internet connected devices such as garage doors, lights, cameras or any device that can be connected to the Internet and send or receive data and/or commands.

BACKGROUND

Control systems for controlling home appliances via the Internet are well known in the art. For example, Nest Labs is a home automation company that designs and manufactures sensor-driven, Wi-Fi-enabled, self-learning, programmable thermostats and smoke detectors. Nest is compatible with most standard HVAC systems that use central heating and cooling and uses industry standard connections to facilitate the control of these appliances. The Nest control system consists of two primary pieces of hardware viz. a display that contains the main printed circuit board (PCB) and rotating ring; and the base that houses the connection terminals.

The Nest thermostat is built around an operating system that allows interaction with the thermostat via spinning and clicking of its control wheel. This control is used for accessing option menus for switching from heating to cooling, access to device settings, energy history, and scheduling. Users can control Nest without a touch screen or other input device. As the thermostat is connected to the Internet, updates can be pushed to fix bugs, improve performance and add additional features. Thus, the thermostat can be controlled from and receive updates through its Internet connection.

Still other inventions are more specific to the opening and closing of garage doors. U.S. Pat. No. 6,998,977 which is herein incorporated by reference in its entirety, teaches an apparatus for controlling a movable barrier operator such as a garage door. A network interface is electronically connected to the garage door for connecting the garage door to a network. In use, the garage door communicates directly over a user's local network by exchanging status request messages. A problem with this architecture is that users must go through a complicated setup process to allow for any outside communication. Moreover, average persons often do not have the time or technical ability to accomplish a complex set-up process. This type of network typically requires additional paid services to guarantee uninterrupted access to control the door. These services might include paying for ISP (Internet Service Provider) for a static IP Address or alternatively subscribing to a dynamic DNS service such as provided by Dyn Inc. (www.dyndns.com).

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 2 is a diagram illustrating how a command device is configured to communicate with the end user's Wi-Fi using a mobile app.

FIG. 7 is a flow chart diagram illustrating the processes of the command device at start-up.

Figure 1:
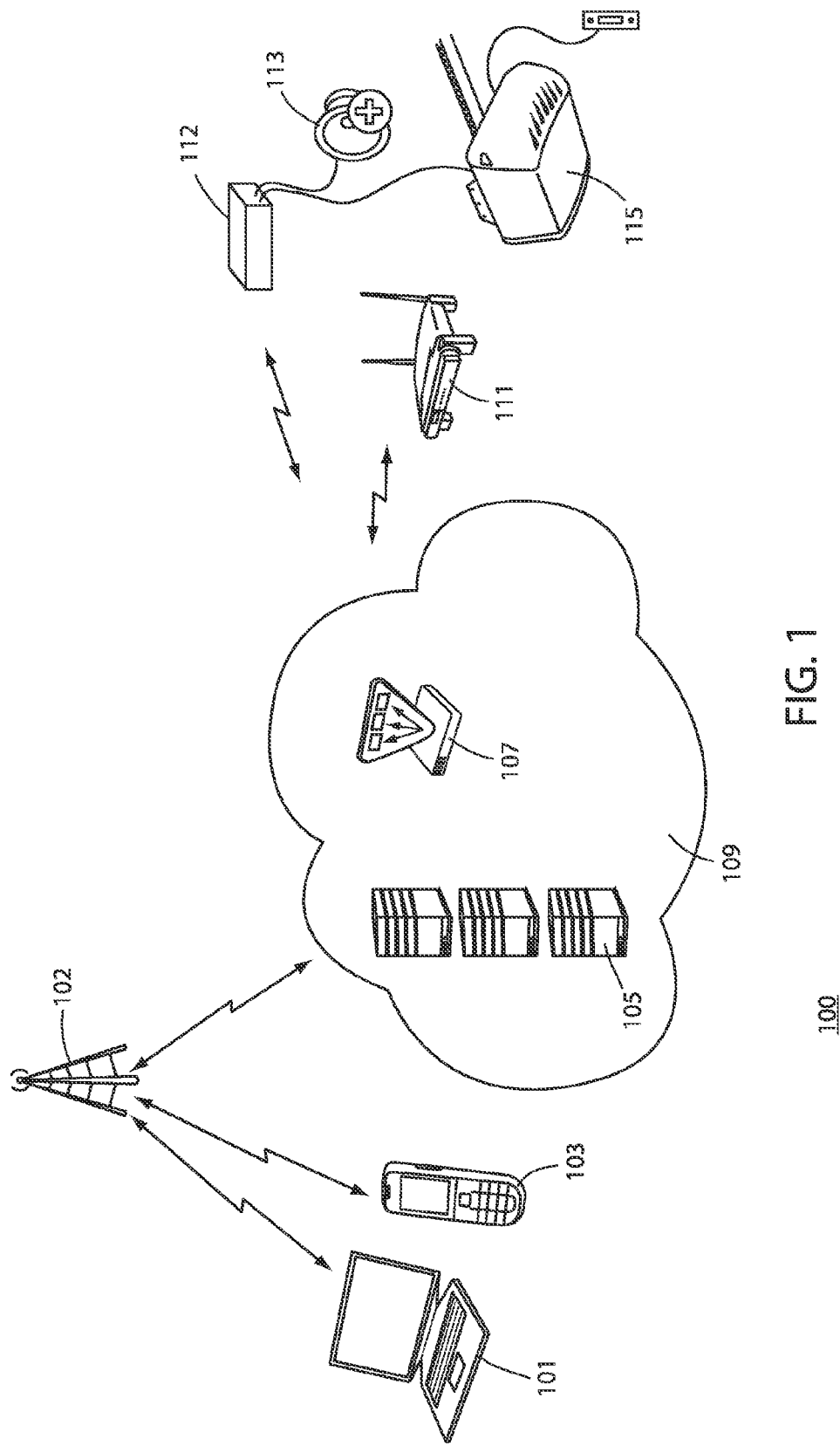
FIG. 1 is a diagram illustrating an Internet enabled user device communicating in the Cloud through a load balancer, access/business logic server, which communicates over the Internet to a wireless router installed at the home/business which then communicates to the wireless enabled command device that simulates a garage door opener button/switch.
Figure 3:
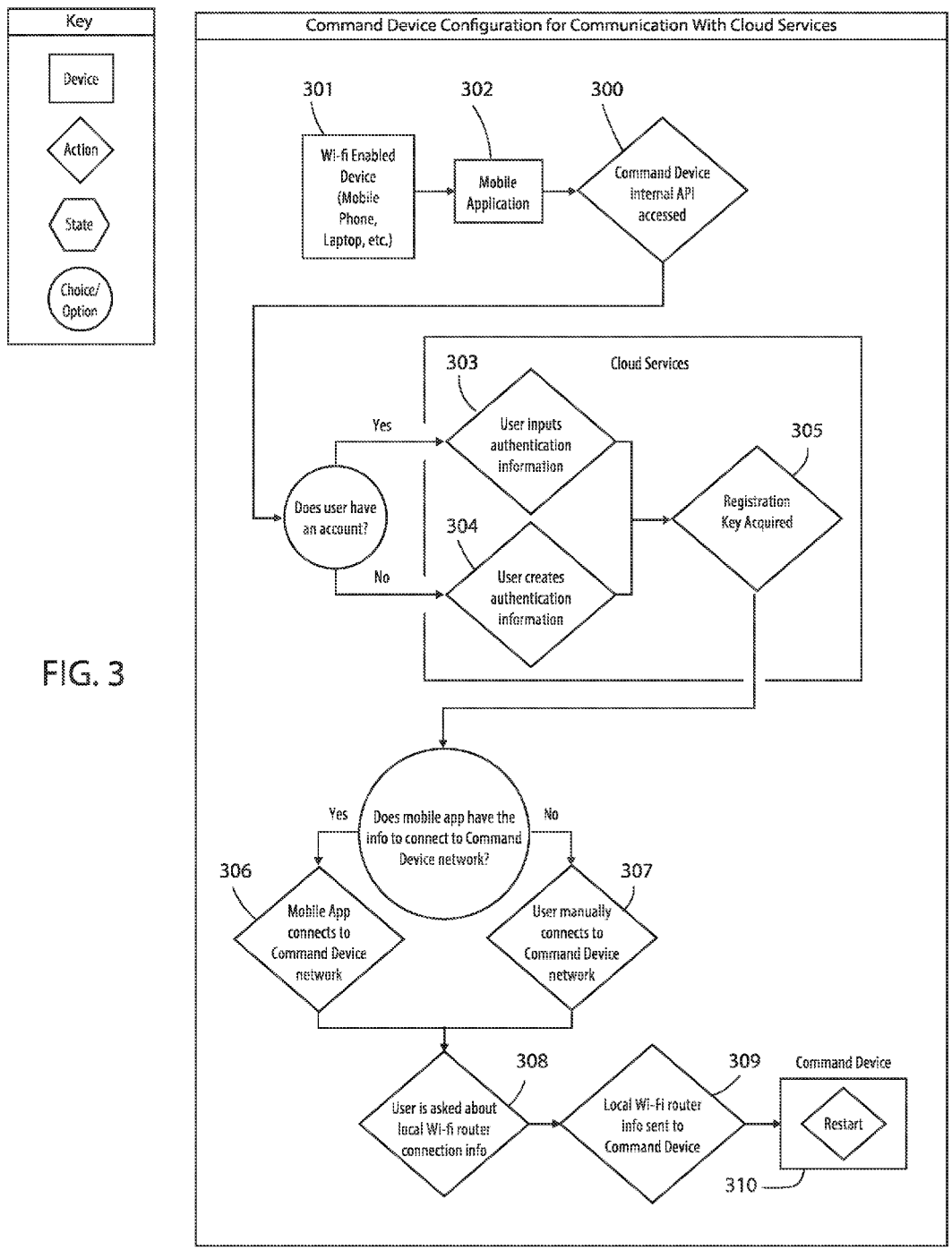
FIG. 3 is a diagram further illustrating how a command device is configured to communicate with the end user's Wi-Fi using a mobile app.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a control system for providing Cloud based commands for controlling operation of an Internet connected device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control one or more processors to implement, in conjunction with certain non-processor circuits, some, most, or all of the functions of a control system for providing Cloud based commands to control an Internet connected device as described herein. The non-processor circuits may include, but are not limited to, a radio receiver, a radio transmitter, signal drivers, clock circuits, power source circuits, and user input devices. As such, these functions may be interpreted as steps of a method to perform the control of an Internet connected device using Cloud based commands. Alternatively, some or all functions could be implemented by a state machine that has no stored program instructions, or in one or more application specific integrated circuits (ASICs), in which each function or some combinations of certain functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIG. 1 is a diagram illustrating a communications arrangement used in an embodiment of the invention where an Internet enabled user device communicates to a load balancer in the Cloud. The load balancer then communicates to business logic/access servers in the cloud, which in turn communicate to a router on the premises of the user/business to a command device to an Internet connected device. The "command device" resides within a user's area of operation and/or control. More specifically, it is the device that directly interfaces with the Internet connected device. The command device authenticates any request it receives from the associated Cloud services to verify it is securely communicating with the correct services to prevent "man in the middle" (MITM) attacks. The command device should be considered a pass-through controller, that is to say it has no information concerning the actual Internet connected device and simply responds to commands it receives from the Cloud services. Such commands include but are not limited to toggling a relay or requesting data from the Internet connected device. The command device is normally but is not limited to communicating to the Cloud services via a wireless connection that is available in the area of operation. Thus, an important aspect of the present invention is that the Internet connected device control system operates though Cloud based servers and might also be referred to as a server-based controlled device (SBCD).

According to an embodiment of the invention, the Internet connected device communication system 100 includes an Internet-enabled mobile communications device such as a laptop computer 101, mobile phone 103 or any type of Internet capable tablet device. The portable device 101 communicates with a networked communications device 102 such as a mobile phone cell site, Wi-Fi hub, or wired network connection such as a local area network (LAN). The network communications device 102 in-turn communicates with a load balancer 107. The load balancer 107 then communicates with one or more servers 105. As noted herein, a load balancer 107 works to distribute the communications load across a communications network. The load balancer 107 communicates to a server 105 which transmits data via the Cloud/Internet 109. This data is then communicated to a personal Wi-Fi and/or wired network 111 at the user's location. The Wi-Fi network 111 wirelessly communicates with the command device 112 although wired control is also an option. The command device 112 communicates with the Internet connected device 115. As described herein, the command device 112 works with an Internet connected device 115 that may or may not actuate the Internet connected device using its own independent controller.

Thus, an important aspect of the present invention is the manner upon which the user can control the Internet connected device. This occurs when the command device 112 communicates with Cloud servers via the user's "at location" Wi-Fi connection to operate an Internet connected device 115. Those skilled in the art will recognize a Cloud server or Cloud server Services is any server or set of services that have a public facing interface. Most but not all, Cloud services, reside completely offsite from their client's Command device and Portable devices. Cloud services provide all of the business logic, authentication, and communication mediums for the given invention. Hence, Cloud services are what determine the status of an Internet connected device and provide users a means to interact and control the Internet connected device. Cloud services also allow shared access to other users, provide alerts, and any other function useful to users or administrators. These services include but are not limited to load balancers, databases, communication servers, emailing and messaging servers, web servers, authentication servers and more.

Communication with Cloud servers may be from an embedded device or a separate device attached to the user's Internet connected device, otherwise known as the command device 112. Thus, another aspect of the invention is that the command device 112 can integrate with any Internet connected device. Thus, according to another embodiment of the invention, the user never communicates directly with the Internet connected device 115 but instead communicates through one or more Cloud-based servers 105. This allows better control of the Internet connected device. This is advantageous since all control communications can be set-up to circumvent on-premises routing including firewalls, static IP/DHCP addressing and port forwarding, while being completely secure using full duplex transmission over a TCP connection. Communication will likely occur over HTTPS in order to encrypt and decrypt user traffic/requests to the command device for controlling the Internet connected device.

Another aspect of the present invention is how the Internet connected device's command device is configured to communicate with an on-premises wireless router using a secure encryption such as WPA/WPA2. 200 This process starts when the command device, that needs to be configured, is powered to an "on" state 201. The firmware configures the wireless module inside the command device to be in an access point mode 202. This mode creates a private wireless network similar to a home Internet router/access point. The name of wireless network (SSID) is derived from a unique device identifier such as a serial number. The ad-hoc wireless network may use WPA/WPA2 encryption with a key also derived from the unique identifier for added security 203. Once broadcasting, the command device is connected 204 to a wireless enabled mobile device such as a laptop or smartphone 205. IP addresses are handed out to the connected mobile device via a DHCP server running on the command device. The command device is interacted through an application programming interface (API) available through a locally hosted webserver on the command device. This API can be accessed securely with eitheran external application (such as a mobile application running on a mobile phone or tablet device) 206 or via an internal web server 207 provided by the command device 208. Information about connecting to the user's on-premises wireless network is provided to the command device through the API.

In order to configure secure information about connecting to the user's cloud account, a registration key is used. The registration key is created via a secure connection to the cloud services API whereby a user logs in and requests a key. The registration key is tracked by the cloud services in such a way that upon receiving a registration request from the command device the cloud services know which user account to attach the command device. This registration key is provided as part of the command device configuration. The command device is then restarted where the command device uses the securely configured information to connect to the user's on-premises wireless router. After a connection is made to the user's on-premises wireless router and network, a connection to the cloud API is created through the user's network to the Internet and the registration key is used to connect the command device to the cloud API and the user's cloud account. At this point, the command device is fully connected to the cloud API over a secure connection that does not require any special configuration of the user's on-premises router or network. If errors occur during the process they are available for review via the command device's API. Errors include, but are not limited to incorrect on-premises wireless router information and/or an invalid registration key. The status of the device state throughout the setup process can be relayed with visual and audio indicators such as LED lights and piezo buzzers. Thus, an important aspect of the invention is how the device can communicate its operational state to the user without a readout or screen.

When the internal web API 300 is accessed via a mobile application 302, running on a device that can connect to the Internet 301, the mobile application presents a simple, step-by-step interface that guides the user through the configuration process. The application first gathers authentication information from the user to connect to 303 or create a cloud account 304 for the user. A registration key is then acquired 305 from the cloud API using the user's account information. The mobile application then either automatically connects to the command device that is broadcasting the ad-hoc wireless access point 306 or guides the user through making this connection 307. Once the mobile device is connected to the command device the user is asked for information about their on-premises wireless router 308. This information is then sent to the command device using the web API 309 and the command device restarts 310.

In use, the command device 112 communicates through a wireless router to the Cloud where the load balancer 107 resides. Those skilled in the art will recognize that the load balancer 107 is a device that distributes communication between one or more servers 105. The servers act as reverse proxy that allows for full duplex (simultaneous, two-way) communication between the communications devices 101, 103 and the command device 112 which in-turn operates the Internet connected device 115. Thus, the load balancer is used to increase capacity of concurrent users as well as to increase the reliability of the mobile device application or app operating on the portable device 101, 103.

In use, a user connects to a server 105 though a portable device that is Internet enabled such as a laptop 101, smart phone 103 or tablet running a mobile application including but not limited to that of a cloud hosted web application (web app). Those skilled in the art will recognize that the user never communicates directly with the Internet connected device 115 or command device 11. Instead, the user communicates to one or more servers that will interpret both user authentication and user rights. Business logic in the server 105 operates to transmit alerts, push notifications and scheduling notices etcetera by sending commands to the Internet connected device's command device 112 associated with a specific Internet connected device 115. The user connects using the mobile application (or alternatively via a web app/website) through the load balancer 107 to one or more servers 105 for controlling operating of the Internet connected device. As will be described herein, when the user requests to "activate" the Internet connected device, a number of sequential steps must occur for the activation command to succeed. In accordance with the invention, a user of the Internet connected device has no way of "directly" controlling or accessing either the command device 112 or the device controller 115. Instead, they must communicate through the Cloud based server 105.

Furthermore, the command device may act as a pass-through to allow Cloud services to operate other peripherals that relate directly to the Internet connected device. An example of such peripherals may include but are not limited to: interior/exterior lights and security cameras within the area of operation. Additionally, the Cloud services may also operate the Internet connected device in an automatic fashion based upon previously defined software/business logic. For example, such logic may include but is not limited to a) activating the Internet connected device after it has been idle a defined amount of time; and/or b) attempting to activate the Internet connected device a second time after a failed initial attempt. Notifications could include but are not limited to notifying the user that the Internet connected device failed to activate or that unauthorized access was gained via another method other than the Cloud services. An example might be actuation of a home security alarm or manually activating the Internet connected device.

Figure 4:
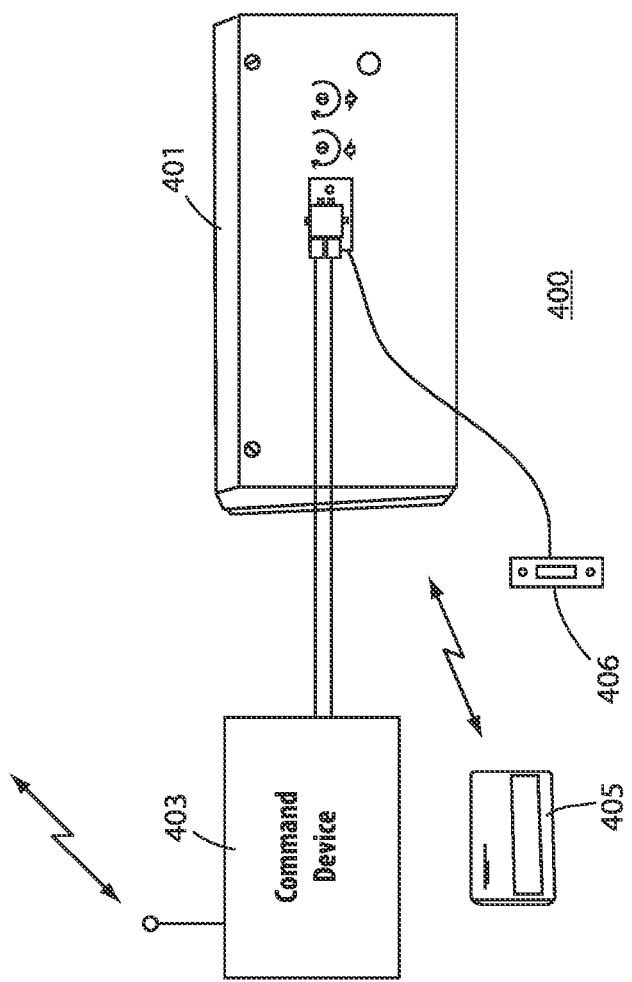
FIG. 4 is a diagram illustrating how a command device simulates a button press by connecting to the same terminal on the garage door controller as that of a hard wired garage door button control.

As seen in FIG. 4, by way of example, a garage door controlling system 400 includes a device for controlling the garage door position such as an opener 401. A wireless receiver 405 typically operates the opener 401, however according to a further aspect of the invention, an opener 401 can also be controlled by the user through a server which sends commands to a separate command device 403. In this way, the command device 403 is typically connected to the same wired terminals of the opener 401, as would the wired garage door button controller 406.

Hence, FIG. 4 illustrates how a garage door controller simulates a "button press" by connecting to the same electrical terminal on the garage door controller as that of a physical wired garage door button controller 406. In order to open the garage door, the user requests the garage door to be opened/closed on a mobile enabled device typically by actuating a touch screen button that is displayed in software on the mobile device. This request is sent into the Cloud where it is interpreted by a load balancer. The load balancer sends the request to the "least used" server. The server then executes business logic software algorithms to determine if the garage door should be opened/closed and proceeds accordingly. Those skilled in the art will further recognize that business logic may include, but is not limited to, a server that determines if the user is authorized to access the moveable barrier or door. In order to determine if movement is necessary, the server requests a "distance" measurement from the garage door device in order to determine the status of the door (see below "request distance"). If the garage door needs to be moved, the server sends a request to the command device 403 to simulate a physical button press. Thereafter, an acknowledgment is sent from the command device 403 to the server and relayed by the server in reply to the user through the Internet/Cloud to confirm action and new garage door position status.

If the user makes the appropriate request, the server will provide a position status of the garage door. This status indicates whether the garage door is either in 1) a full or partially opened position or 2) in a fully closed position. When a request is made for the command device to report its status, the distance from the Sonar device to the open door or from the Sonar device to the garage floor is made using a Sonar or like device to determine distance. This enables a position status to be computed in the Cloud based upon "known" distance variables and algorithms set in memory upon installation.

To determine position status, the server initially sends a request to the command device. The command device will request the Sonar unit take a distance reading. The Sonar unit makes the distance reading or determination and communicates the measurement to the command device, which then responds to the server with the distance measurement or other corresponding value. The server then calculates door status, which is saved in memory for immediate and/or later use. Thus, another important aspect of the invention is that an Internet enabled mobile device can simulate a mechanical button press and determine open/close status by communicating though a server, which provides control commands to a command device. The command device acts as the garage door opener with direct communication with the garage door controller. The user opening the garage door or other barrier has no direct communication with the door controller.

Figure 5:
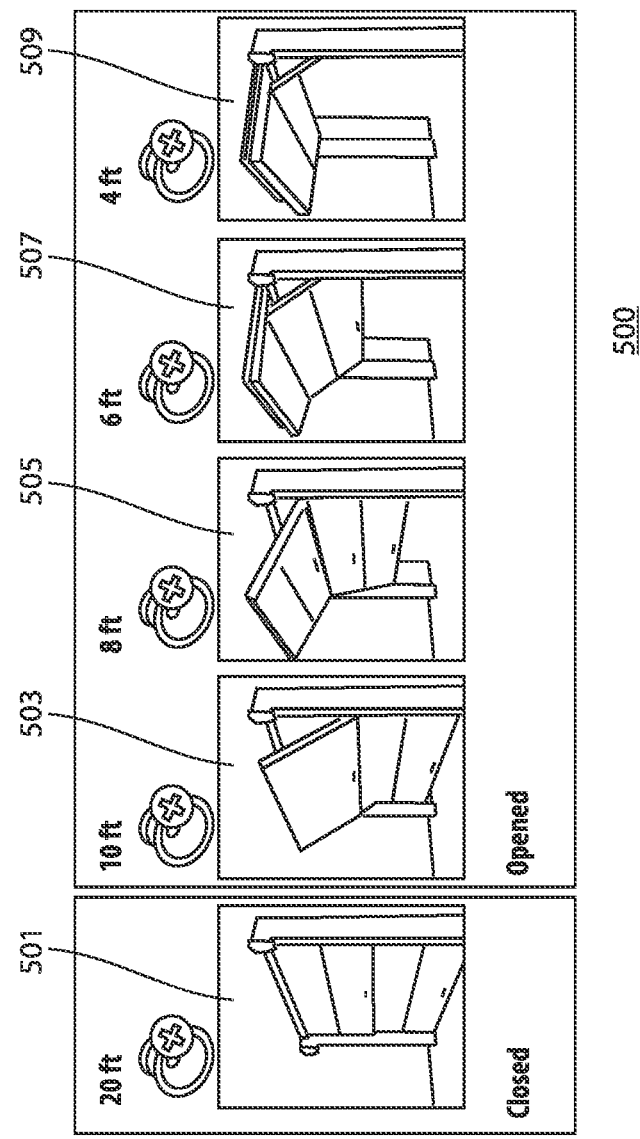
FIG. 5 is a diagram illustrating how a Sonar device reads the distance between it and either the garage floor or the garage door.

FIG. 5 illustrates how the sonar device measures the distance between the ceiling of the garage and either the floor or the garage door. Panel 501 illustrates how the sonar device detects the full distance between the ceiling and the floor because the garage door is fully closed and not interrupting the sonar signal. This position is detected as fully closed. Once the garage door begins to open, it interferes with the sonar signal and starts to read the distance between the ceiling and garage door. Panel 503 illustrates when the garage door has started to open and therefore the garage door status is updated to open. Panels 505, 507 and 509 illustrates examples where the distance getting smaller between the sonar device and door, as the door further opens. Finally, panel 509 illustrates where door fully in the open state since the smallest distance is detected between sonar device and door.

Figure 6:
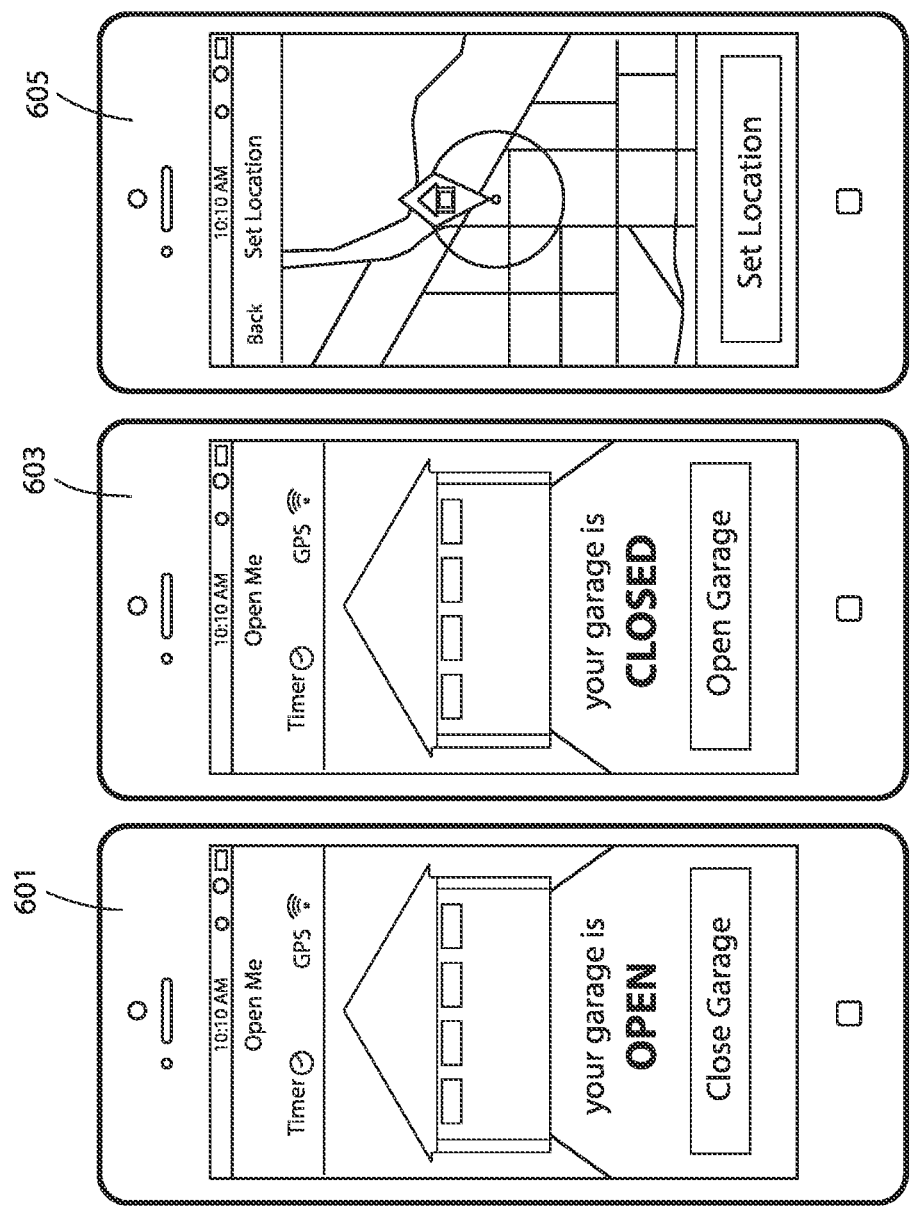
FIG. 6 illustrates a series of screen shots of the Internet enabled user device showing various garage door positions while as well as a screen for setting a location of the garage door so that it may be opened and/or closed at some predetermined radius from the garage door utilizing the GPS location of the user's device.

FIG. 6 illustrates various screen displays of the Internet enabled user device showing various Internet connected device states. More specifically, screen display 601 illustrates an image with an activated Internet connected device with a button at the lower portion of the screen to activate the door. Conversely, screen display 603 illustrates a screenshot with the Internet connected device in a deactivated position with a button at the lower portion of the screen to activate the Internet connected device. Finally, screen display 605 is a screenshot illustrating a map where the user can set the location of the Internet connected device with a predetermined radius surrounding the location where the Internet connected device might be automatically activated. Thus, a further aspect of the invention allows the user with an accompanying mobile app and web interface to activate their Internet connected device from anywhere in the world while providing some predetermined separation. Furthermore the user can request state of the Internet connected device (as computed by the server from the reported readings of the Internet connected device). Users can also set a Global Positioning System (GPS) position on their smart phone, which allows the mobile app to request the servers to activate the user's Internet connected device when they have entered or departed a predetermined radius from the Internet connected device. It is important to recognize that the GPS position does not directly control the state of the Internet connected device, but rather reports to the cloud services when it is within or exterior to a user defined range. This cloud service then determines if the Internet connected device should be activated.

FIG. 7 is a flow chart diagram illustrating the processes of various embodiments of the server based Internet connected device at start-up. The start up process 700 begins where the command device 701 is plugged into the Internet connected device 703. Power is applied 705 and a wireless network is broadcasted 707 by the command device, which enables wireless enabled devices 709 to connect to the command device for easy configuration 711. This configuration includes setting up an IP address and entering account information 713 for the Cloud based services 719. The command device logs into Cloud services 715 and the device registers to a Cloud based user account 717. Thereafter, the Cloud Services 719 gives the command device 723 a unique authentication key 721. With this authentication key, the command device 723 connects to Cloud services via web sockets (and can fallback to long-polling if needed) for full-duplex communication 725 enabling mobile apps 727 to communicate with the command device 723 through the Cloud services.

Figure 8:
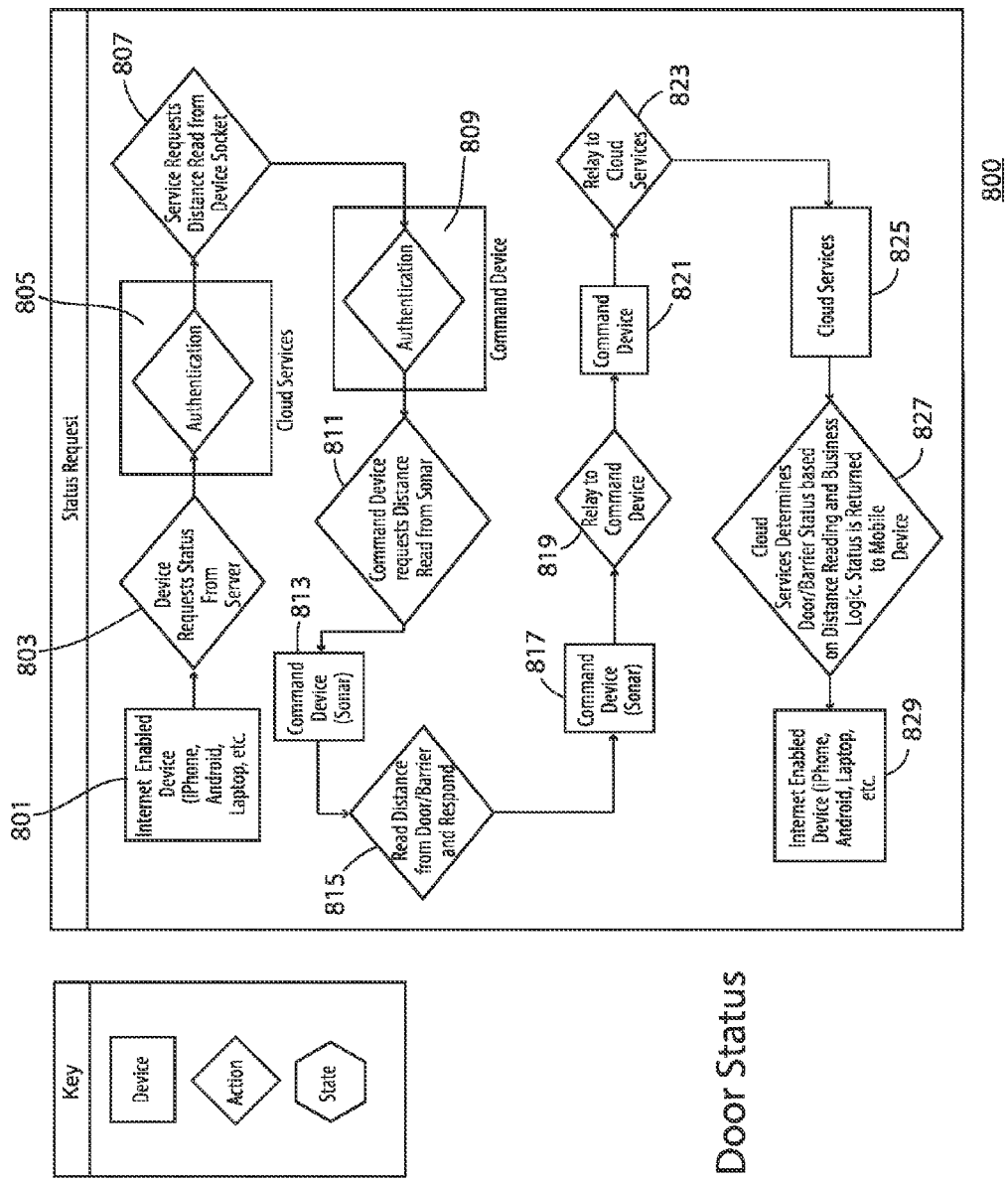
FIG. 8 is a flow chart diagram illustrating operational status of the door.

FIG. 8 is a flow chart diagram illustrating operational state of the Internet connected device. The Internet connected device state process 800 begins where the Internet enabled device such as an iPhone, android or laptop 801 requests the state from a Cloud based server 803. After an authentication process 805, the Cloud based server makes a request to determine the state over the socket connection 807 to the command device 809, which in turn authenticates the request before requesting a state value 811 from the Internet connected device 813. The Internet connected device determines its local state using appropriate means local to the Internet connected device where it is then communicated 819 to the command device 821. Once at the command device, this information is communicated to Cloud services 823 where the Cloud services 825, work to determine the state based on the Internet connected device local state 827. Thereafter, this information is conveyed to the Internet enabled mobile device 829 where it can be displayed to the user.

Figure 9:
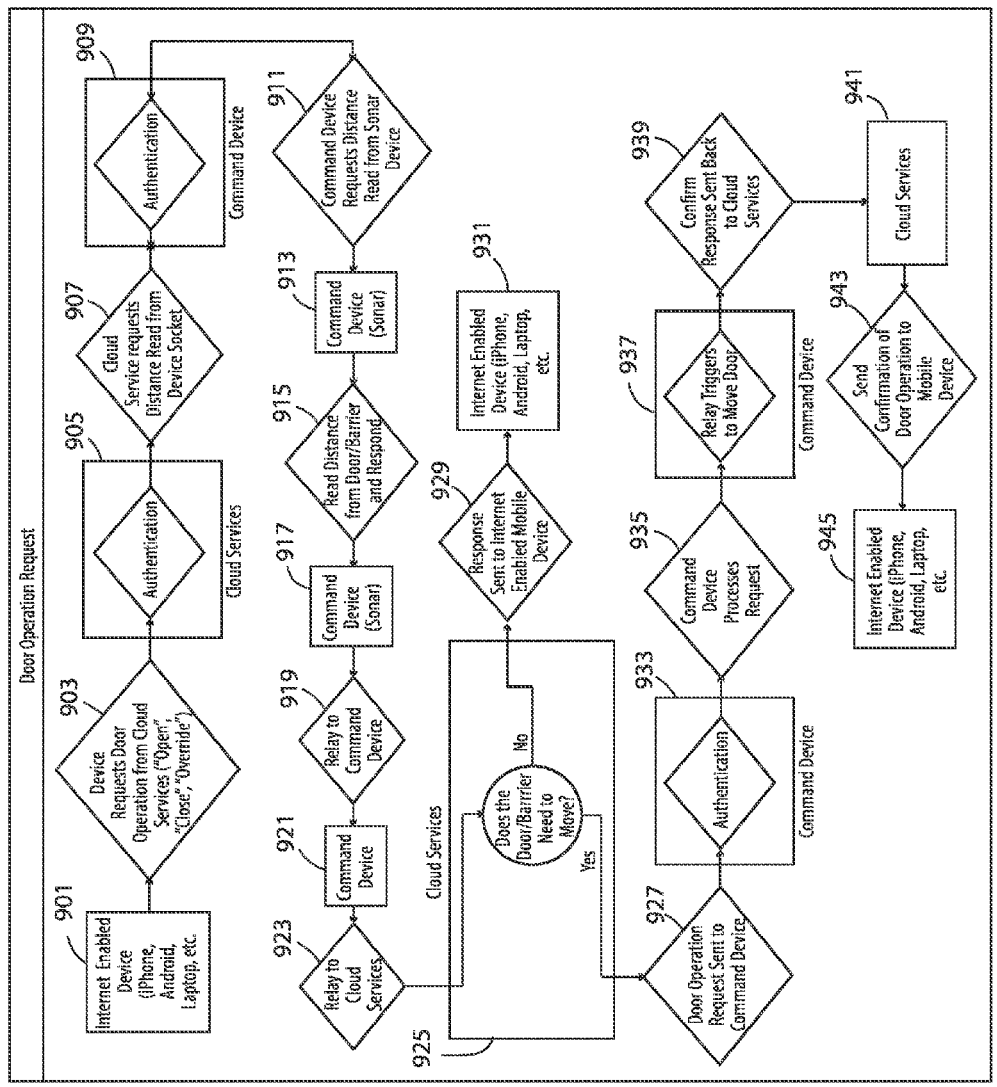
FIG. 9 is a flow chart diagram illustrating operational movement of the door.

FIG. 9 is a flow chart diagram illustrating operational movement of the barrier or door. The process of moving the door 900 to an "opened" or "closed" position includes the steps of using the Internet enabled device 901 to request door movement from Cloud services 903. This would include moving the door either into an opened or closed position. After the mobile application is authenticated 905, a service request is sent 907 to the command device 909 from the Cloud services 905. This request is authenticated 909 by the commanding device 909 and the commanding device requests a distance "read" or measurement from the accompanying Sonar device 911. The Sonar device 913 works to provide a distance read from the device to the garage door or to the garage floor using echolocation. The Sonar device 917 then communicates this information to the command device 921 where the command device 923 communicates this data to Cloud services 925.

While in Cloud services 925, a determination is made if the door needs to move. This information is determined based on the distance reading from the Sonar device and logic stored in Cloud services. This determination can be made using a data comparison between the measured and stored distance data. If the garage door does not need to move, a response is sent to the Internet enabled device 929 where it can be displayed to the User on the device 931. If the garage door or barrier does need to be moved, a door operation request is sent to the controlling device 933. After the command device authenticates the request 933, the operational request is processed 935. This communication triggers and/or activates the door to move 937 and a confirmation response is sent back to Cloud services 939. While at Cloud services 941, a confirmation response is sent back to the Internet enabled device 943 where the door movement and end result can be displayed to the user using text, sound queues and/or visual icons 945.

Thus, embodiments of the present invention are directed to a garage door and/or movable barrier opening system that includes at least one server for receiving commands in a first mode from a portable communications device and converting the commands to a second mode for sending to a commanding device. Likewise at least one server may be used for receiving commands in a second mode from a commanding device and converting the commands to a first mode for sending to a portable communication device. A load balancer may be used for receiving commands from either the first or second mode and relaying them to at least one Cloud server. A Wi-Fi transceiver works for receiving the commands in the second mode from the Cloud and wirelessly communicating the commands in the second mode to a command device attached to or embedded within a garage door opener unit. A distance measuring sensor is connected to the commanding device for measuring the open distance of a garage door to the garage floor; and where the distance is communicated back to the server for determining whether the status of the garage door or movable barrier should be changed based on user location or commands from a portable web enabled device.

In still other embodiments, an Internet connected device control system includes an Internet enabled mobile device that works with an Internet connected device operator. A command device works with the Internet connected device operator for controlling activation of an Internet connected device based on commands received from the Internet enabled mobile device in communication with at least one server. A network interface electronically is connected to the command device for enabling the command device to communicate with a Cloud based network. The Cloud based network responds to requests received by the Internet enabled mobile device in a first mode by sending the state of the Internet connected device over the Cloud based network from at least one server over the Cloud based network. The command device responds to the state change request by activating the Internet connected device. Thus, the state of the Internet connected device is determined solely in the Cloud and the user never communicates directly with the Internet connected device operator but instead activation and state are controlled by at least one server in the Cloud.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A control system for providing Cloud based commands to an Internet connected device comprising:
   at least one server for receiving commands from at least one web enabled user device and at least one web enabled controlling device;
   an Internet connected device command device for receiving commands and controlling operation of an Internet connected device from at least one Cloud server; and
   wherein the state of the Internet connected device is determined by using information provided by the Internet connected device to a server where business logic is processed and can be changed from a cloud based server based on the user's position that is based upon a global positioning system (GPS) reported to the server.

2. A control system as in claim 1, further comprising:
   a load balancer for receiving communication from at least one controlling device for distribution of the communication to the Cloud server.

3. A control system as in claim 1, wherein the Cloud server will automatically activate the Internet connected device after a predetermined amount of time if the present state determines the Internet connected device needs to be activated by the Cloud server.

4. An Internet connected device control system comprising:
   at least one server for receiving commands in a first mode from a portable communications device and converting the commands to a second mode;
   a load balancer for sending and receiving commands from at least one server and communicating the commands in the second mode to a Cloud server; and
   a Wi-Fi transceiver for receiving the commands in the second mode from the Cloud and wirelessly communicating the commands in the second mode to a server based Internet connected device command device; and
   wherein the state of the Internet connected device can be changed based on the user's geographic location determined using a global positioning system (GPS).

5. An Internet connected device control system as in claim 4, wherein the state of the Internet connected device can be determined by information processed from the at least one server where data was transmitted by the Internet connected device.

6. An Internet connected device control system as in claim 4, wherein the portable communications device is a smart phone, tablet, laptop, PC or any other Internet enabled device.

7. An Internet connected device control system comprising:
   an Internet enabled mobile device;

a control operator using a command device for controlling activation of an Internet connected device based on commands received from the Internet enabled mobile device in communication with at least one server;

a network interface electronically connected to the command device for enabling the command device to communicate with a Cloud based network where the Cloud based network responds to requests received by the Internet enabled mobile device in a first mode by sending the state of the Internet connected device over the Cloud based network from at least one server in a second mode; and wherein the network interface receives a state change request from at least one server over the Cloud based network and the command device responds to the state change request by activating the Internet connected device and where the state of the Internet connected device is changed based on a user's geographic location determined using a global positioning system (GPS).

8. An Internet connected device control system as in claim 7, wherein the state of the Internet connected device is determined by at least one server.

9. An Internet connected device control system as in claim 7, wherein the state of the Internet connected device is determined based upon Internet connected device local information provided by the Internet connected device.

10. An Internet connected device control system as in claim 7, wherein the state of the Internet connected device is determined before it is activated.

11. An Internet connected device control system as in claim 7, wherein at least one server will automatically activate the Internet connected device after a predetermined amount of time if the at least one server indicates a change of state should be activated.

12. An Internet connected device control system as in claim 7, wherein a user of the Internet connected device control system communications with at least one server for activating the Internet connected device using a cellular, Wi-Fi, or wired networked communications network.

* * * * *